United States Patent [19]
Sansoucy

[11] Patent Number: 4,487,310
[45] Date of Patent: Dec. 11, 1984

[54] METAL DETECTOR DEVICE FOR AUGER FEED GRANULATORS

[75] Inventor: David E. Sansoucy, Whitinsville, Mass.

[73] Assignee: Polymer Machinery Corporation, Berlin, Conn.

[21] Appl. No.: 389,687

[22] Filed: Jun. 18, 1982

[51] Int. Cl.³ .............................................. B65G 43/00
[52] U.S. Cl. ................................... 198/524; 198/856; 198/657; 340/674; 200/61.09
[58] Field of Search ............... 198/502, 856, 866, 861, 198/657, 524; 209/1, 548, 600, 930; 340/627, 674, 676, 673; 200/153 R, 61.09

[56] References Cited

U.S. PATENT DOCUMENTS

| | | | |
|---|---|---|---|
| 2,455,750 | 12/1948 | Freed | 198/657 X |
| 2,513,745 | 7/1950 | Reynolds | 340/674 X |
| 3,344,346 | 9/1967 | Halsey | 198/502 X |
| 3,553,672 | 1/1971 | Smith | 340/627 |
| 3,588,686 | 6/1971 | Lingmann et al. | 340/676 X |
| 3,597,756 | 8/1971 | Jackson | 340/676 |
| 3,676,773 | 7/1972 | Eckhardt | 200/61.09 X |
| 4,030,593 | 6/1977 | Deboffles | 198/861 X |
| 4,161,251 | 7/1979 | Paul | 209/626 X |

FOREIGN PATENT DOCUMENTS

| | | | |
|---|---|---|---|
| 1018003 | 10/1957 | Fed. Rep. of Germany | 198/502 |
| 2911186 | 10/1980 | Fed. Rep. of Germany | 198/861 |
| 2428848 | 2/1980 | France | 198/502 |
| 146440 | 2/1981 | German Democratic Rep. | 198/502 |

Primary Examiner—Robert J. Spar
Assistant Examiner—Jonathan D. Holmes
Attorney, Agent, or Firm—Prutzman, Kalb, Chilton & Alix

[57] ABSTRACT

A metal detector device for an auger feed granulator is provided in association with the auger trough and comprises a plurality of first conductive plate elements in spaced-apart disposition axially along the bottom portion of the auger trough and a plurality of second conductive plate elements in spaced apart disposition axially along the bottom portion of the auger trough with each second plate element being disposed between adjacent pairs of first plate elements. The first and second plate elements are electrically insulated and have an upper portion disposed adjacent but spaced from the outer circumferential edge of the auger. An electrical circuit for detecting any metal object simultaneously contacting any one of the first plate elements and any one of the second plate elements is electrically connected thereto. The electrical circuit includes circuitry for producing a voltage potential between the first plates and the second plates and for detecting an electrical connection between any one of the first plates and any one of the second plates as caused by a metal object. The circuitry includes a relay and switch for deactivating the auger motor upon detection of a metal object.

10 Claims, 2 Drawing Figures

METAL DETECTOR DEVICE FOR AUGER FEED GRANULATORS

TECHNICAL FIELD

The present invention relates to metal detectors and, more particularly, to a metal detector device for auger feed granulators.

Auger feed granulators are utilized in conjunction with plastic processing machinery to transform the plastic scrap material attendant the processing operations into a granulated form for ultimate reprocessing. As plastic scrap material including sprues and runners are generated by a manufacturing process it can be collected for subsequent processing but preferably is fed directly to an auger feed granulator where it is cut into a granulated state for reprocessing. The immediate reduction to a granulated state protects the resin from contamination and facilitates storage and handling. Generally, the hopper of the auger feed granulator is placed under or alongside the plastic processing equipment in such a position to allow the plastic scrap material to be directed into the auger feed trough and thence, into a cutting chamber where the plastic is granulated by a number of cutting knives.

BACKGROUND OF THE INVENTION

During the collection and granulating of scrap plastic material metal components of the processing machinery itself or of the mold or miscellaneous small pieces of metal may fall into the auger feed trough and be conveyed into the granulating chamber where it can cause damage to the cutting knives. The pieces of metal, including any metal from the damaged knives, contaminates the reground plastic which is normally fed back to the principal plastic processing equipment where the metal contaminants could cause damage to the plastic processing equipment creating loss of production and defective molded parts.

It has been proposed that metal detectors for use in auger feed granulators magnetically detected the presence of metallic contaminants in the scrap plastic material. These magnetic detectors are somewhat limited since they are sensitive only to ferrous materials that exhibit magnetic properties. Thus, non-ferrous objects would elude such a detector thereby damaging the cutting knives and contaminating the granulated plastic. Other detectors that electrically detected the presence of metal contaminants are cumbersome, complicated and and unduly costly to manufacture.

SUMMARY OF THE INVENTION

In accordance with the present invention there is provided a metal detector for use in an auger feed granulator for plastic material that is of simple, compact construction yet efficient operation. This new and improved metal detector provides for electrically detecting ferrous and non-ferrous metal contaminants within the plastic material. Advantageously the detector is self-contained, is easily incorporated into the granulator and provides easy access for cleaning. The metal detector is economical to manufacture and durable and safe in use.

Other features and advantages will be in part obvious and in part pointed out more in detail hereinafter.

These and related features are achieved in accordance with the present invention by providing a metal detector device for a granulator that includes a cutting chamber, an auger rotatably mounted within an auger trough for transporting material from a feed hopper to the cutting chamber, and a motor for rotating the auger. The metal detector is associated with the auger trough and comprises a plurality of first conductive plate elements in spaced-apart disposition axially along the bottom portion of the auger trough and a plurality of second conductive plate elements in spaced apart disposition axially along the bottom portion of the auger trough with each second plate element being disposed between adjacent pairs of first plate elements. The first and second plate elements are electrically insulated and have an upper portion disposed adjacent but spaced from the outer circumferential edge of the auger. An electrical circuit for detecting any metal object simultaneously contacting any one of the first plate elements and any one of the second plate elements is electrically connected thereto. The electrical circuit includes circuitry for producing a voltage potential between the first plates and the second plates and for detecting an electrical connection between any one of the first plates and any one of the second plates as caused by a metal object. The circuitry includes a relay and switch for deactivating the auger motor upon detection of a metal object.

A better understanding of the objects, advantages, features, properties and relationships of the invention will be obtained from the following detailed description and accompanying drawings which set forth an illustrative embodiment and are indicative of the way in which the principles of the invention are employed.

DESCRIPTION OF A PREFERRED EMBODIMENT

Figure 1:
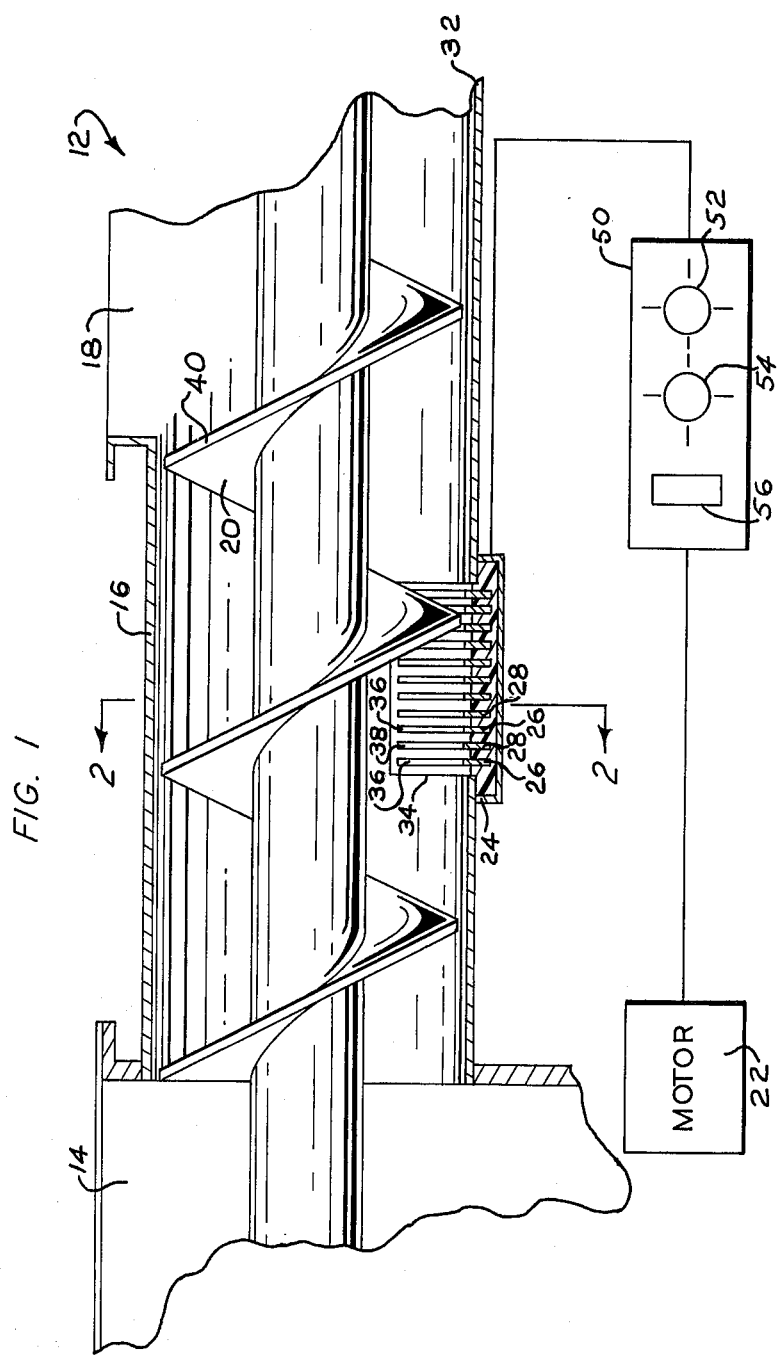
FIG. 1 is a sectional view of the auger trough portion of a granulator showing the metal detector mounted in the trough and schematically illustrating the electrical circuit associated therewith.

Referring now to the drawings in greater detail wherein like reference numerals indicate like parts within the different figures, the metal detector device of the present invention, generally designated by the numeral 10, is shown in FIG. 1 mounted in an auger feed granulator, generally designated by the numeral 12. The auger feed granulator 12 comprises a cutting chamber 14, a feed hopper 18, and an auger trough 16 extending between chamber 14 and hopper 18 and providing communication therebetween. An auger 20 is operatively mounted in the trough 16 for transporting or conveying plastic material from the feed hopper 18 along the trough 16 to the cutting chamber 14. A motor 22 is operatively connected to the auger 20 for rotatably driving the auger in a conventional manner. Further details of a typical granulator of the type shown may be found in U.S. Pat. No. 4,071,198 entitled "Apparatus for Granulating Materials".

Figure 2:
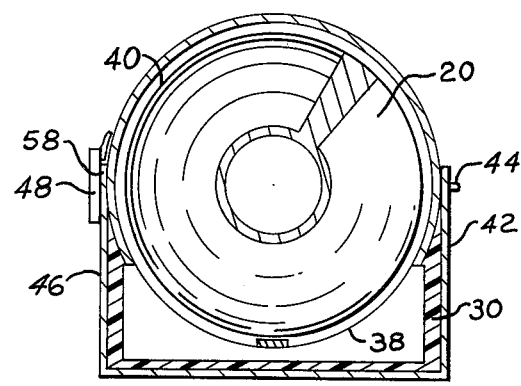
FIG. 2 is sectional view taken along the line 2—2 of FIG. 1.

The metal detector 10 generally comprises a detector box or frame 24 housing a plurality of spaced-apart alternating first and second metal detector plates 26, 28 electrically insulated from each other and from the frame by being submerged in a wear resistant epoxy resin 30 or other similar insulating material. The detector plates 26, 28 are mounted in parallel alignment within the frame 24 in orthogonal position relative to the axis of the auger 20. The frame 24 is mounted on the exterior of the trough 16 on the bottom wall portion 32 at an aperture or cutout 34 therein so that the arcuate top surfaces 36, 38 of detector plates 26, 28, respectively, are substantially coextensive with the interior surface of the wall portion 32 and therefore are disposed adjacent but spaced from the outer circumferential edge 40 of the auger 20. The top surfaces 36, 38 are concave as shown in FIG. 2 to envelope a substantial segment, about 120°, of the outer circumferential edge 40 of the auger. As shown in FIG. 1, the plates 26, 28 are spaced axially along a limited length of the bottom portion of the auger trough. The detector plates 26, 28 preferably are comprised of carbon steel or other electrically conductive material and are thin flat members that are uniformly spaced in parallel by a distance of about 1/16 inch to ¾ inch with the preferred spacing being slightly greater than the thickness of the plates, e.g., about ⅛ inch to ⅜ inch. As will be appreciated, the spacing may vary but should be less than the size of the metal objects sought to be detected within the plastic material being conveyed.

As best shown in FIG. 2, the rear wall 42 of frame 24 is pivotally mounted to the auger trough by a hinge 44 while the opposite or front wall 46 thereof is releasably secured to the trough by means of a latch 48. Thus, upon the release of the latch 48 the frame 24 will rotate downwardly and away from the auger trough to provide access to the metal object detected by the device.

An electrical circuit, illustrated in the form of a control box 50 in FIG. 1, is electrically connected to the detector plates 26, 28 and produces a voltage potential between adjacent plates 26 and 28. The electrical circuit 50 includes a relay connected to the motor 22 and the detector plates 26, 28. This relay (not shown) is actuated to deactivate the motor 22 upon an electrical connection between a detector plate 26 and a detector plate 28 such as would occur when a metallic object is touching both plates.

The circuit 50 also includes a first indicator light 52 to indicate that the motor and auger are running, a second indicator light 54 to indicate that the auger and motor are deactivated, and a reset switch 56 that must be actuated to restart the motor 22 after it has been deactivated by the relay. The reset switch thus provides a desirable safety feature of the device. The electrical circuitry 50 is preferably a low voltage circuit, such as 12-volt circuitry.

A disconnect switch 58 is mounted in cooperation with latch 48 to also deactivate motor 22 upon the release of the latch 48. The motor 22 cannot be reset until the latch 48 is closed thereby incorporating an additional safety feature.

In operation, scrap plastic material from the manufacturing process enters the auger trough 16 through the hopper 18. The auger 20 moves this scrap material through the trough 16 toward the cutting chamber 14 wherein cutting knives granulate the plastic material for ultimate reprocessing. Should a metallic object from the plastic mold or the processing machinery accidentally fall into the hopper 18, it will rapidly move to the bottom of the trough 16 as the auger 20 conveys it along with the plastic material towards the cutting chamber 14. When the metallic piece reaches the area of frame 24, it is carried over the series of detector plates 26, 28 that are arrayed perpendicular to the auger axis. As the metal piece simultaneously contacts the surfaces 36, 38 of the plates, it completes the low-voltage circuit to actuate the relay and deactivate the motor 22 thereby immediately stopping the auger 20.

The quick-acting latch 48 is released to allow the frame 24 with the detector plates 26, 28 to pivot downwardly exposing the detector plates and provide ready access to the metallic object for removal. Upon removal of the metallic object and the re-attachment of frame 24 by closing latch 48, motor 22 can be re-started but only after actuation of the reset switch 56. In this manner, both ferrous and non-ferrous metals are effective to halt the auger 20 and thereby prevent damage to the cutting blades and contamination of the reprocessed plastic material.

Upon release of the latch 48 for any type of cleaning or repair to the frame 24 or within the auger trough 16, the disconnect switch 58 will deactivate the motor 22 for the safety and protection of the operator.

Thus, it can be seen from the foregoing description that a metal detector for auger feed granulators is provided that is not only of simple design and economical to manufacture but also is durable and safe in use. It provides for detection of both ferrous and non-ferrous metal objects and allows quick and easy access to and removal of such objects.

As will be apparent to persons skilled in the art, various modifications, adaptations and variations of the foregoing specific disclosure can be made without departing from the teachings of the present invention.

I claim:

1. In an auger feed granulator for plastic material having a feed hopper, a cutting chamber, an auger trough connecting the hopper to the chamber, an auger rotatably mounted within the trough for transporting material from a feed hopper to the cutting chamber and a motor means for rotating said auger, the improvement comprising a metal detector device associated with said trough comprising
    a plurality of first conductive plate elements in spaced-apart disposition axially along the bottom portion of said auger trough, said first plate elements having upper portions disposed adjacent the outer circumferential edge of said auger,
    a plurality of second conductive plate elements in spaced-apart disposition axially along the bottom portion of said auger trough with each said second plate element being disposed between adjacent pairs of first plate elements and electrically insulated therefrom, said second plate elements having upper portions disposed adjacent the outer circumferential edge of said auger, and
    electrical circuit means for detecting a metal object contacting any one of said first plate elements and any one of said second plate elements, said electrical circuit means being electrically connected to said first and second plate elements.

2. The device of claim 1 wherein said electrical circuit means includes means for producing a voltage potential between said first plates and said second plates and means for detecting an electrical connection between any one of said first plate elements and any one of said second plate elements.

3. The device of claim 1 wherein said electrical circuit means is connected to said motor means and includes means for automatically deactivating said motor means upon detection of a metal object.

4. The device of claim 3 wherein said motor means includes a starter switch means, said means for automatically deactivating said motor means comprising a relay element electrically connected to said started switch means, said relay being activated upon a metal object contacting any one of said first plate elements and any one of said second plate elements.

5. The device of claim 1 comprising;
a frame releasably mounted to said bottom portion of said auger trough in alignment with an aperture in said trough, said first and second plate elements being mounted to said frame in parallel disposition so that said upper portions of said plate elements are disposed adjacent said edge of said auger and
insulation means electrically insulating said first plate elements from said second plate elements.

6. The device of claim 5 wherein said first and second plate elements are secured to said frame by an epoxy material, said material insulating said frame and said plate elements.

7. The device of claim 5 wherein said frame has opposed wall portions, hinge means pivotally mounting one wall portion to said trough, and latch means releasable latching another wall portion to said trough.

8. The device of claim 5 wherein said electrical circuit means includes switch means connected to said latch means and said motor means for deactivating said motor means upon releasing said latch means to pivot said frame from said trough.

9. The device of claim 1 or 5 wherein each said first and second plate elements have a top edge at said upper portion, said top edge being concave to envelope in spaced disposition a segment of the circumferential edge of said auger.

10. The device of claim 1 wherein the distance between each adjacent pair of a first plate element and a second plate element is at least about the thickness of the plate elements.

* * * * *